Sept. 15, 1931.  M. TIBBETTS  1,823,711
MOTOR VEHICLE
Filed Jan. 3, 1927  2 Sheets-Sheet 1

Inventor
Milton Tibbetts

Sept. 15, 1931.   M. TIBBETTS   1,823,711
MOTOR VEHICLE
Filed Jan. 3, 1927   2 Sheets-Sheet 2

Inventor
Milton Tibbetts

Patented Sept. 15, 1931

1,823,711

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed January 3, 1927. Serial No. 158,459.

This invention relates to motor vehicles, and more particularly to means for locking electric switches and mechanical parts of motor vehicles.

As a means of preventing unauthorized operation of motor vehicles, it is common practice to provide ignition switch locks therefor. Certain forms of ignition switch locks, have the disadvantage that a thief may bridge the switch contacts and thereby start the engine without operating the lock. Attempt has been made to overcome this difficulty by armouring the ignition circuit conductors between the switch and the apparatus to which the conductors extend. Such armour renders it somewhat more difficult to bridge the switch contacts, but it provides only a partial solution of the problem, because it is necessary for the conductors, at some point, to emerge from the armour in order that they may be connected to the associated apparatus, for example the distributor, the source of ignition current or the induction coil.

Another disadvantage of certain ignition locks is that they permit the ignition circuit to remain open without being locked and, hence encourage the tendency of many operators to leave their cars unlocked.

An object of the present invention is to render inaccessible and inoperative the power mechanism of motor vehicles.

A related object is to lock the ignition switch and bonnet of a motor vehicle.

An additional object is to lock and release a plurality of members by separate operations.

A still further object is to effect a locking or a release of a plurality of members by a single operation.

A more specific object is to control the locking of the ignition switch and bonnet of a motor vehicle in accordance with a single operation.

A feature of the invention is a combined ignition and bonnet lock for a motor vehicle.

Another feature is a lock control mechanism adapted to actuate both a bonnet lock member and an ignition switch and to retain the switch closed and the bonnet released while the mechanism is unlocked.

A further feature is a combined bonnet and ignition lock adapted to be released upon the mere insertion of a key.

A further feature is a lock mechanism wherein an element having small mass and limited movement is adapted to retain or release an extensively movable member of large mass.

The invention resides in a mechanism including a control device adapted to be locked or released and to retain or release a plurality of other members and to be actuated by a single control operation. The position of certain of the members to be locked, i. e. either locked or released, is determined by the action of yielding members exerting opposing forces, one of which members may exert a greater force than the others. The stronger yielding member is adapted, in the released condition of the control member, to move the locked elements and yieldingly retain them in the released position. The weaker of the yielding members is adapted, in the locked condition of the control member, to move certain of the members to be locked to the locked position.

Other objects of the invention will appear from the following description taken in connection with the drawings, which form a part of this specification.

Like reference characters have been used to indicate like parts in the several figures of the drawings, wherein.

Figure 1:
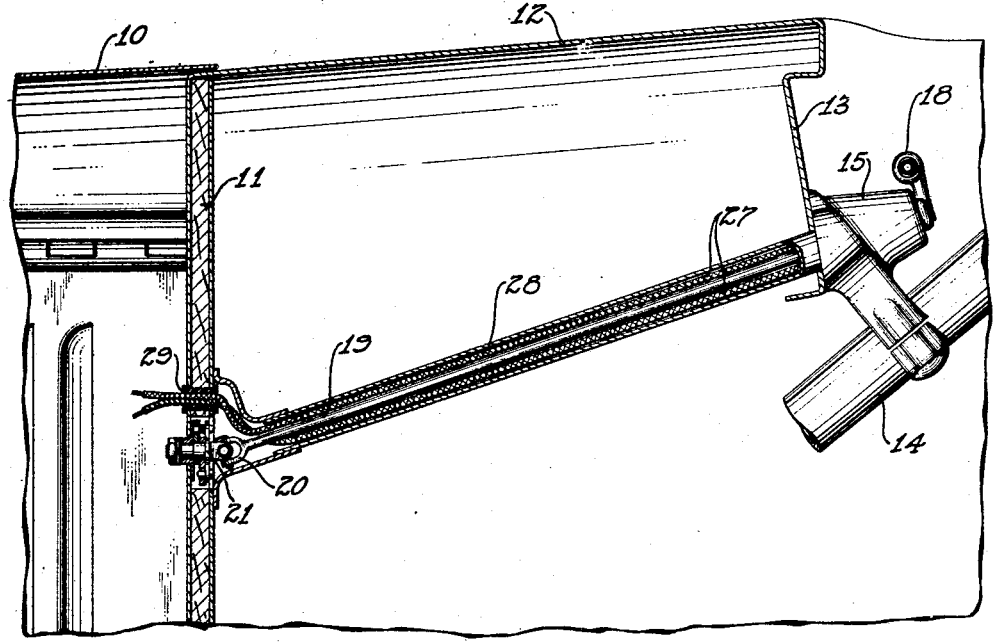
Fig. 1 is a side elevation partly broken away and part in section of a motor vehicle embodying the invention.
Figure 2:
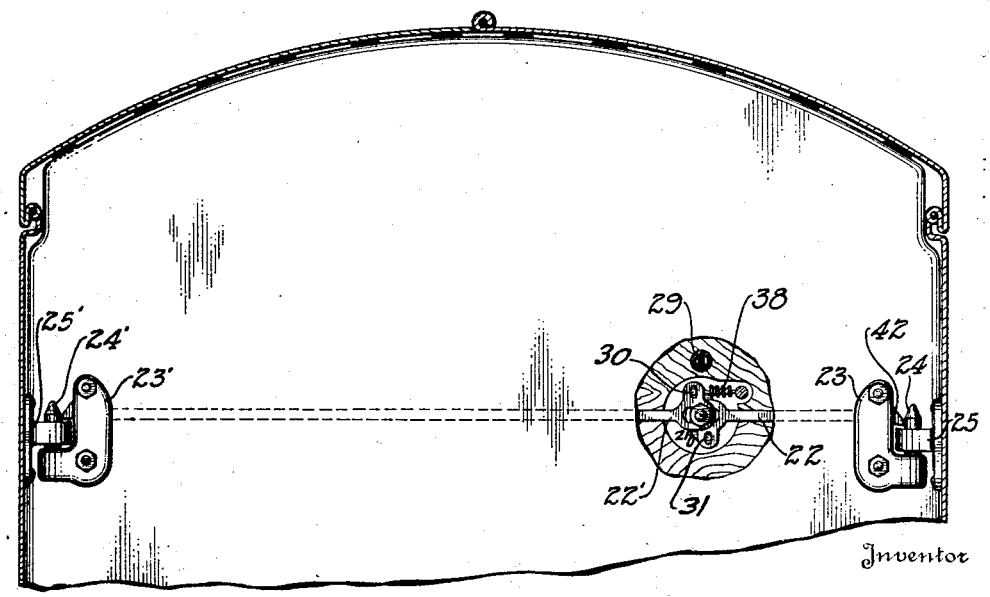
Fig. 2 is a front view of the dash partly broken away.
Figure 3:
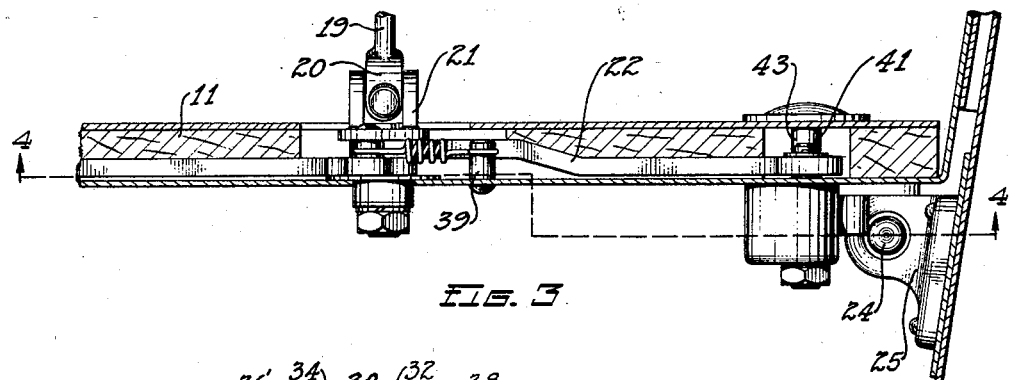
Fig. 3 is an enlarged longitudinal sectional view of the right hand portion of a lock element shown in Fig. 2.
Figure 4:
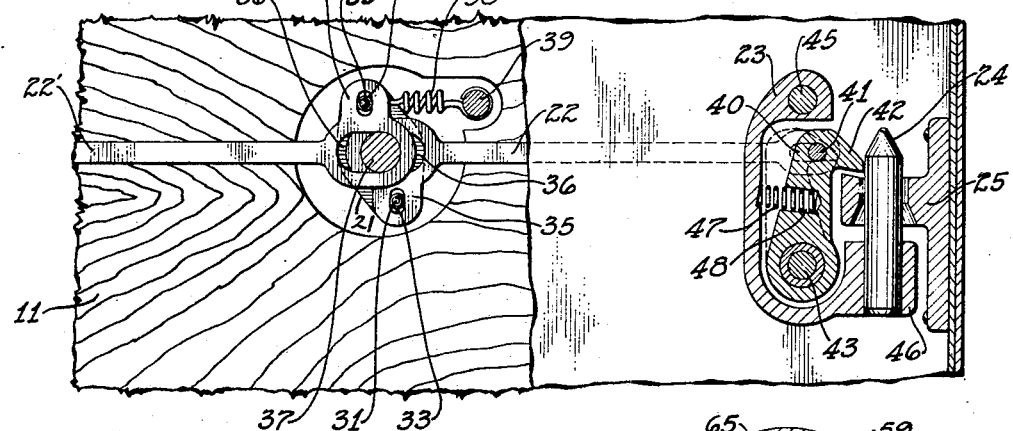
Fig. 4 is an elevation, taken substantially on line 4—4 of Fig. 3.
Figure 5:
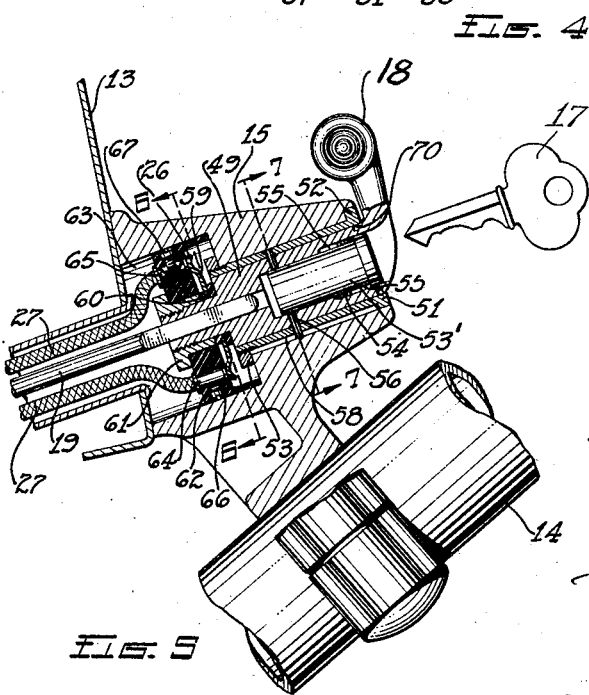
Fig. 5 is an enlarged view partly in section of the portion of the lock mechanism shown mounted on the instrument panel in Fig. 1.

Fig. 1 shows a portion of a motor vehicle, including a bonnet 10, a dash 11, a cowl 12, an instrument panel 13, and a steering column 14. Supported upon the instrument panel 13, and the steering column 14, is a lock having a casing 15 enclosing a lock mechanism. The lock is provided with a key 17, a slot for the insertion thereof and a control member or handle 18 which is adapted to actuate an ignition switch 26 (Fig. 5) and a bonnet lock (Figs. 2, 3 and 4). The latter elements will be described in detail later.

The handle 18 is connected to one end of a rod 19, extending from the instrument panel to the dash. Conductors 27, included in the ignition circuit, are connected to the two terminals of the switch 26. The rod 19 and the conductors 27 are enclosed in a tube 28, extending between the dash and the instrument panel, to protect and prevent access to the rod and conductors. At the other end of the rod 19 adjacent to the dash, is an integral yoke 20, formed to provide means for connecting a rotatable cam member 21. The cam and yoke are so connected as to form a well known universal joint. The cam member is adapted to actuate rods 22 and 22' (see Fig. 2), transversely movable in a suitable slot provided in the dash 11. The rods are supported at their outer ends by brackets 23 and 23' attached to the sides of the dash, between the top and bottom thereof and are adapted to actuate latches 42 normally abutting pins 24 and 24', fastened in the brackets 23 and 23'. Catches 25 and 25', comprising eye plates, are attached to the two sides of the bonnet 10 in such position that when the bonnet is closed the catches engage the pins 24 and 24'. The latches 42 and the pins 24 and 24' co-operate to retain the catches and lock the bonnet. The latches, by virtue of their position, are adapted to retain the bonnet so that neither end may be materially raised without great difficulty. The bonnet may be considered, therefore, as an armour element, because it supplements the element 28 to prevent access to a portion of the ignition circuit that would otherwise be exposed.

In Figs. 3 and 4, the latch members and associated elements are shown more in detail. The cam 21, attached to one end of the rod 19, is provided at its two extremities with pins 30 and 31 engaging slots 32 and 33 provided in lugs 34 and 35, respectively, on the inner ends of the rods 22 and 22'. The same ends of the rods 22 and 22' are provided with slots 36 and 36', engaging a bolt 37 on the cam member 21. The slots 36 and 36' permit limited transverse movement of the rods 22 and 22' with respect to the bolt, for causing movement of the associated latches into and out of locked position. A coil spring 38 is attached at one end to a pin 39, fixed to the dash 11, and at the other end to the pin 30 on the cam member 21. This spring exerts a force tending to rotate the cam member 21 in such direction as to move the latch members to unlatched position.

The outer ends of the rods supported by the brackets 23 and 23', have slots 40. In Figs. 3 and 4, the end of only one latch rod is shown in detail, because the two are substantially identical, except as regards their length. Inserted in the slots 40 are pins 41 attached to latches 42. Each latch is pivoted on a bolt 43, which passes through the bracket 23 and functions also to attach one end of the bracket to the dash. The other end of the bracket 23 is attached to the dash 11 by a second bolt 45.

A coil spring 47 abuts at one end the side of the casing 23, and the other end is positioned in a recess 48 in the latch 42. This spring tends to yieldingly force the latch against the pin 24 and hence, into the locked position.

The springs 38 and 47, therefore, exert opposing forces on the rods and associated latches. However, the spring 38 is preferably stronger than the springs 47 so that, when the lock is released by the insertion of a key, the rods and associated latch members move under the action of spring 38 against the force of springs 47 to the unlocked position. The portions of the lock mechanism mounted on the instrument panel, and the ignition switch are shown in detail in Fig. 5. A portion of the upper end of the rod 19 is formed with square cross section and is inserted into a correspondingly shaped axial opening in a rotatable cylindrical member 49. The control handle is formed integrally with the cylinder 49 and is positioned outside of the casing 15. This handle enables the operator to lock the bonnet and open the ignition switch. The cylinder 49 is fitted rotatably within a cylindrical bushing 51, inserted in the casing 15.

The bushing is retained at one end by a lug 52 extending into a slot in the casing and at the other end by a nut 53 threaded thereon. An annular groove 70 is cut in the cylinder adjacent to the handle so that, if an attempt be made to force the lock, the handle will shear off before the other portions of the lock fail. The ignition switch and bonnet will accordingly be retained in locked position.

Figure 7:
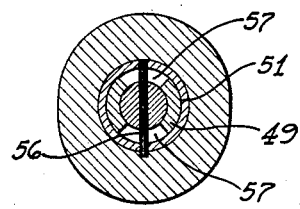
Fig. 7 is a sectional view on line 7—7 of Fig. 5.

Within an axial recess in the cylinder 49, a lock barrel 53' is positioned. This barrel, which is of well known construction, includes tumblers 54 yieldingly pressed into slots 55 provided in the cylinder 49. These tumblers are shown in the locked position, wherein they retain the cylinder 49 with respect to the lock barrel. The lock barrel 53' is retained against axial or rotary movement with respect to the casing and bushing by a pin 56. This pin passes through the barrel and extends through oppositely disposed segmental slots 57 (see Fig. 7) in the cylinder 49 into the bushing 51. The lower end of the pin projects through the bushing into a longitudinal slot 58 in the casing 15. This pin therefore not only prevents movement of the lock barrel 53', with respect to the other portions of the lock, but also prevents rotation of the bushing 51, with respect to the casing 15.

The tumblers 54 shown in the locked position are normally retracted upon the mere insertion of the key 17 so that their ends are flush with the surface of the cylinder 53' permitting rotation of the cylinder 49. The extent of rotation of the cylinder is determined by the extent of the slots 57. These slots are designed to permit sufficient rotation of the cylinder and the rod 19 to effect a complete opening and closing of the latches 42.

The ignition switch 26 (see Fig. 6) includes a contact spring 59 fitted on an axial projection on the cylinder 49 and rotatable therewith. Spring 59 is electrically insulated by washers 60 of dielectric material. The springs 59 and the washers 60 are retained by means of a bushing 61, threaded onto the extension of the cylinder 49. This bushing is also adapted to retain a cylindrical insulating base member 62 fitted into the cylindrical recess 63 within the casing 15. The ends of the switch spring 59 are adapted, in the released position of the lock, to engage the fixed terminal conductors 64 and 65 riveted or otherwise fastened in the base 62. The ignition circuit conductors 27 connect to the terminals 64 and 65 by means of set screws 66 and 67.

Figure 6:
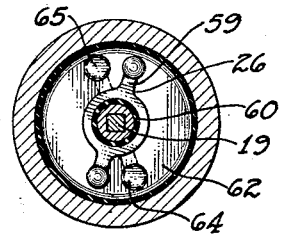
Fig. 6 is a sectional view taken substantially on line 6—6 of Fig. 5.

This invention operates as follows:

Assuming the mechanism to be normally locked, in which condition the tumblers 54 extend into the slots 55, the cylinder 49 is retained against the action of spring 38 (see Fig. 4), the switch contact spring 59 is retained out of engagement with the terminal members 64 and 65, as shown in Fig. 6, and the latch members 42, Fig. 4, are pressed, by the springs 47, into abutment with the associated pins 24. The catches 25 are accordingly retained on the pins 24. The ignition circuit is therefore locked open and the bonnet is locked closed.

Upon the insertion of the key 17 into the slot in the lock barrel 53, the tumblers 54 are retracted, whereupon, the cylinder 49, together with its associated control handle, the switch spring 59, the rod 19, the rods 22 and 22', and the latches 42 are moved by the action of spring 38 to the unlocked position. When unlocked, the latches 42 assume the position shown in dotted lines in Fig. 4 and the ignition switch spring 59 engages the terminals 64 and 65, as shown in dotted lines in Fig. 6. Thereupon the ignition circuit is closed and the bonnet is released.

The key 17 may subsequently be withdrawn from the lock and the members just described will be retained in the unlocked position by the spring 38.

When it is desired to lock the bonnet and break the ignition circuit the control handle 18 is rotated in a clockwise direction. The rods 22 and 22' are thereby moved against the action of spring 38 and the latches 42 are moved under the action of the springs 47 to the locked position. The control handle is locked in position by the automatic engagement of the tumblers 54 with the slots 55 in the cylinder 49.

The operation of this lock is such that the ignition circuit will not remain open and the bonnet cannot be locked while the key 17 remains in the lock. By reason of this fact, the operator of the motor vehicle is compelled to remove the key so that when the operating lever 18 is thrown to stop the engine, the circuit will be locked in an open position and the bonnet locked in a closed position.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a lock mechanism, a combined bonnet and ignition switch lock comprising means for retaining said bonnet closed, and said switch open, means for releasing said lock upon the insertion of a key, and means preventing said ignition switch from being maintained open while said key remains in the lock.

2. In a lock mechanism, a pivoted latch, a spring engaging said latch, a latch arm attached thereto, an apertured lug on said latch arm, a cam member having a pin inserted in said aperture, and a spring engaging said pin, said springs being adapted to exert opposing forces on said latch.

3. In a motor vehicle, a dash, a transverse slot therein, a pair of latch rods movable in opposite directions in said slot, slotted lugs on said rods, a cam having pins inserted in said slots, a control rod and universal joint connections between said rod and cam.

4. In a motor vehicle, a key operated lock mechanism including a combined bonnet and ignition switch lock, means operating automatically, upon the insertion of a key, to unlock said bonnet and close said switch and means requiring removal of said key before said switch can be maintained open and said bonnet locked.

5. In a motor vehicle, a key lock mechanism including means for locking a bonnet and an ignition switch and a yielding element adapted, upon the mere insertion of a key in said lock, to automatically unlock said bonnet and close said switch.

6. In a motor vehicle, a bonnet and an ignition switch, common retaining means for said bonnet and switch, means actuated by the insertion of a key for releasing said bonnet and closing said switch and means requiring removal of the key before locking said switch open and said bonnet closed.

7. In a lock mechanism, the combination of a control device arranged to be moved from one position to another, one of said positions being a locked position and the other an unlocked position, spring means for urging said device towards the unlocked position and yieldingly retaining said device in said unlocked position, a key locked member adapted when the key is out to catch and hold said device in locked position, said member comprising a tumbler lock in which the tumblers are inoperative when the key is in position in the lock, and means for manually shifting the control device from unlocked to locked position.

8. In a lock mechanism, the combination of a control device arranged to be moved from one position to another, one of said positions being a locked position and the other an unlocked position, spring means for urging said device towards the unlocked position and yieldingly retaining said device in said unlocked position, and a key locked member adapted only when the key is out to catch and hold said device in locked position.

9. In a motor vehicle, the combination of a bonnet lock and an ignition switch, spring means for urging the bonnet lock to unlocked position and the switch to "off" position and for yieldingly retaining them there, a control device connected to said bonnet lock and said switch, a key locked member adapted when the key is out to catch and hold said control device in bonnet locked position, said member comprising a tumbler lock in which the tumblers are inoperative when the key is in position in the lock, and means for manually shifting the control device from unlocked to locked position of the bonnet.

In testimony whereof I affix my signature.

MILTON TIBBETTS.